W. E. McCADDON.
PROCESS OF PRODUCING CREAM.
APPLICATION FILED SEPT. 24, 1912.
1,087,599.
Patented Feb. 17, 1914.
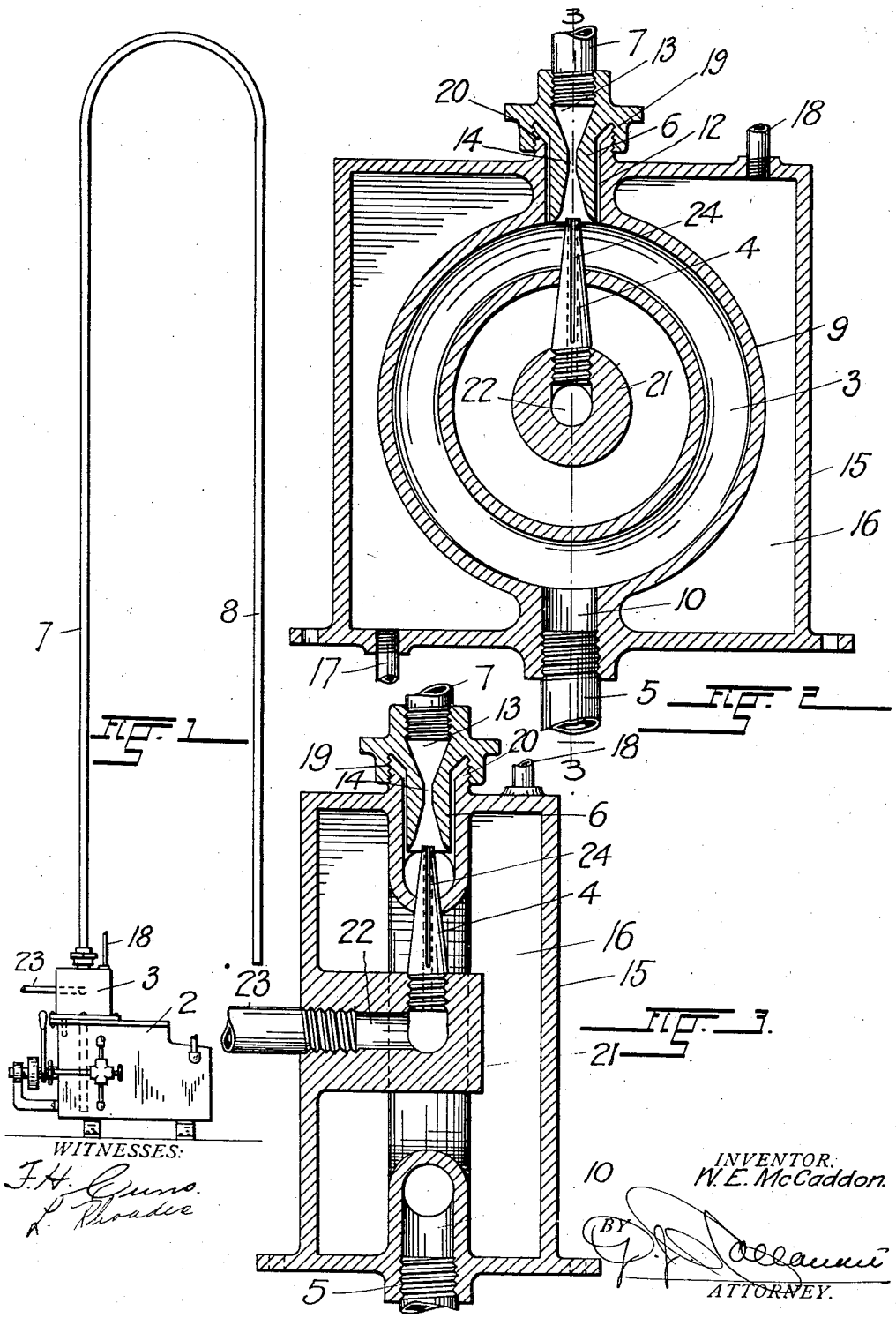
WITNESSES:
INVENTOR.
W. E. McCaddon.
BY
ATTORNEY.

UNITED STATES PATENT OFFICE.

WILLIAM E. McCADDON, OF DENVER, COLORADO, ASSIGNOR OF ONE-HALF TO HERBERT M. DE WITT, OF DENVER, COLORADO.

PROCESS OF PRODUCING CREAM.

1,087,599.  Specification of Letters Patent.  Patented Feb. 17, 1914.

Application filed September 24, 1912. Serial No. 722,066.

*To all whom it may concern:*

Be it known that I, WILLIAM E. McCADDON, a citizen of the United States, residing at Denver, in the county of Denver and State of Colorado, have invented certain new and useful Improvements in Processes of Producing Cream, of which the following is a specification.

My invention relates to a process for the production of cream or imitations thereof from a mixture of a milk product such as milk, skim milk, milk powder or condensed milk, and a fat or oil such as butterfat, cottonseed oil or oleomargarin, and its object resides in providing a novel method of finely dividing the fat particles and mixing the same with the milk product so thoroughly and intimately as to produce a cream which is practically devoid of acidity and which for an extensive period will remain sweet and without the separation of the substances of which it is composed.

My improved process consists essentially in forcibly impelling the emulsion of the milk product and the fat or oil produced in a suitable mixing vat through a narrow passage for the purpose of separating and finely dividing the fatty particles contained therein, and in subsequently driving the emulsion by the same force by which it was driven through the narrow opening, against a determinate resistance for the purpose of intimately commingling the separated fatty globules and the milk product contained therein. The resistance above referred to I preferably produce by raising the emulsion to a determinate height of from eighteen to twenty-two feet at which it is discharged, the altitude to which the matter is raised being varied in accordance with the elevation above the sea-level of the locality where the process is carried out.

To impel the fluid through the narrow passage and to the required elevation, I employ a jet of steam or compressed air which by its ejection from a nozzle, creates a partial vacuum which causes the emulsion to be drawn from the vat in which the milk product and oil are disposed, upwardly through the above-mentioned narrow passage and into a stand pipe which at its upper end, curves downwardly to discharge the product without obstruction of its progress by abrupt changes in the direction of its flow.

In the practice of my process, the emulsion is subjected to heat for the purpose of delivering the product in a sterilized condition and for this reason it is preferable that steam be used in the production of the vacuum as it will naturally aid in raising the matter under treatment to the temperature required for its sterilization.

In carrying out my process, I preferably employ an apparatus of the character shown in the accompanying drawings in the various views of which like parts are similarly designated and in which, Figure 1, represents an elevation of the entire apparatus, Fig. 2, a vertical section through the vacuum chamber and adjoining parts of the apparatus, drawn to an enlarged scale, and Fig. 3, a section taken along the line 3—3, Fig. 2.

Referring more specifically to the drawings; the reference numeral 2 designates a vat of suitable construction in which the milk product and oil are initially combined, 3 a jacketed vacuum chamber in which a partial vacuum is produced by the ejection of steam through a nozzle 4, 5 the suction pipe through which the emulsion is drawn from the vat into the vacuum chamber, 6 a plug which provides the narrow throat through which the emulsion is forced for the purpose of finely dividing its fatty constituents, and 7 the stand pipe in which the emulsion, after having passed through the throat is raised to allow the ingredients thereof to commingle by the resistance produced by the gravitative tendency of the column of fluid in the pipe. As it is essential that the flow of fluid through the stand pipe be equable and unobstructed, the latter is at its upper extremity, curved semi-circularly and continued in a downwardly extending leg 8 through which the cream is discharged at any desired point.

The vat 2 in which the milk product and the fat is contained may be of any suitable construction and it is preferably provided with an agitation mechanism by means of which the constituents are mixed to form an emulsion before being drawn upwardly into the vacuum chamber 3. The latter is composed of a vertically disposed annular conduit 9 which at its lowest point has an inlet 10 which connects with the suction pipe 5 and which at a thereto diametrically opposite point, is provided with an outlet 12 which is occupied by the beforementioned plug 6 whose axial bore 13 is contracted intermediate of its extremities to provide a narrow throat 14 through which the emulsion is forced for the purpose of separating its fatty particles.

A rectangular casing 15 which surrounds the vacuum chamber, provides a jacket 16 through which, in the operation of the apparatus, water or other fluid is circulated for the purpose of reducing the temperature of the apparatus, and which to this end is provided at diagonally opposite points with a water inlet pipe 17 and a discharge pipe 18.

The plug 6 is, by means of an integral nut 19, screwed upon an upwardly extending nipple 20 on the casing 15, the upper end of its axial bore 13 is threaded to receive the correspondingly threaded extremity of the stand pipe and the opposite end of the said bore flares downwardly from its contracted throat 14 to admit the tip of the tapering nozzle 4 which is screwed into a threaded opening in a core 21 formed integral with the casing 15. The opening in which the nozzle is secured, communicates with an axial duct 22 in the core, which extends at right-angles to the said opening and which connects at its outer end with a pipe 23 through which the steam or compressed air is conducted to the nozzle from a conveniently located source of supply.

The nozzle 4 has in its exterior surface, a plurality of longitudinally extending grooves 24 which provide passages for the emulsion from the vacuum chamber to the throat 14 in case the nozzle is by either its own adjustment or by that of the plug 6, brought in too close proximity to the surface of the bore 13 in the latter to allow a free and unobstructed upward flow of the fluid toward the stand pipe 7. The stand pipe consists of a tube which at a point from eighteen to twenty feet above the surface upon which the apparatus is installed, is bent in a semi-circular curve and extended downwardly for the purpose of delivering the cream at a point of lower elevation.

In the operation of my invention the milk-product and oil contained in the vat 2 are initially mixed by means of a suitable stirring apparatus and raised in temperature by heat applied to the vat in any convenient manner. The ejection of steam from the nozzle 4, creates a partial vacuum in the annular chamber 3 which causes the emulsion to be drawn from the vat 2 through the suction pipe 5 and through the chamber 3 into the bore 13 of the plug 6 to be forced through the narrow throat 14 in which the fatty constituents of the emulsion are separated. After having passed through the throat, the finely divided substances are forced upwardly into the stand pipe against the weight of the column of fluid contained therein and are thereby thoroughly commingled until they are discharged through the delivery leg 8 in the form of a cream.

While as hereinabove explained, my process may be effectively used for the production of imitation cream from a milk product and oleomargarin or other oil, it is particularly adapted to be employed for the production of cream from a milk product such as skim-milk, condensed milk or milk powder, and butterfat, and the product obtained by my process while being adapted for many different purposes has been found to be of special value in the manufacture of ice cream and the like, more particularly at places where fresh cream is not available or the supply thereof is limited.

While I have shown and described my invention in the best form at present known to me, I wish it understood that means other than the downwardly curved leg may be employed to obtain an unobstructed discharge from the upper end of the stand pipe, and that other changes in the arrangement and construction of the parts of the apparatus, may be availed of within the scope of the claims.

Having thus described my invention what I claim and desire to secure by Letters-Patent is:

1. The herein described method of producing cream or the like consisting in impelling a mixture of a milk product and a fat, to a point of discharge against a resistance produced by its own weight.

2. The herein described method of producing cream or the like consisting in impelling a column of liquid consisting of a mixture of a milk product and a fat, upwardly to a point of discharge against a resistance produced by its own weight.

3. The herein described method of producing cream or the like consisting in impelling a mixture of a milk product and a fat, to a point of discharge against a counteracting pressure, by a force which is greater than said pressure.

4. The herein described method of producing cream or the like consisting in impelling a mixture of a milk product and a fat, to a point of discharge against a counteracting pressure, by a force which exceeds said pressure to a predetermined degree.

In testimony whereof I have affixed my signature in presence of two witnesses.

WILLIAM E. McCADDON.

Witnesses:
    JOHN TRINDLE,
    W. C. WORLEY.